US011923646B2

(12) United States Patent
Emigh et al.

(10) Patent No.: US 11,923,646 B2
(45) Date of Patent: Mar. 5, 2024

(54) SLIP RING ASSEMBLY WITH PAIRED POWER TRANSMISSION BANDS

(71) Applicant: CR FLIGHT L.L.C., Carmichael, CA (US)

(72) Inventors: Jonathan D. Emigh, Somerset, CA (US); Ray Porter, Somerset, CA (US); James M. Ritchey, Carmichael, CA (US)

(73) Assignee: CR FLIGHT L.L.C., Carmichael, CA (US)

( * ) Notice: Subject to any disclaimer, the term of this patent is extended or adjusted under 35 U.S.C. 154(b) by 92 days.

(21) Appl. No.: 17/501,737

(22) Filed: Oct. 14, 2021

(65) Prior Publication Data

US 2022/0109278 A1 Apr. 7, 2022

Related U.S. Application Data

(63) Continuation of application No. PCT/US2020/029065, filed on Apr. 21, 2020.

(Continued)

(51) Int. Cl.
*H01R 39/10* (2006.01)
*H01R 39/22* (2006.01)
*H01R 39/34* (2006.01)

(52) U.S. Cl.
CPC ............. *H01R 39/10* (2013.01); *H01R 39/22* (2013.01); *H01R 39/34* (2013.01)

(58) Field of Classification Search
CPC ......... H01R 39/10; H01R 39/22; H01R 39/34
See application file for complete search history.

(56) References Cited

U.S. PATENT DOCUMENTS 3,032,616 A 5/1962 Harrington
5,173,053 A 12/1992 Swanson
(Continued)

FOREIGN PATENT DOCUMENTS

DE 249792 9/1987
DE 249792 A1 * 9/1987
(Continued)

OTHER PUBLICATIONS

DD249792A1_translate (Year: 1987).*
(Continued)

*Primary Examiner* — Tulsidas C Patel
*Assistant Examiner* — Mohammed Ahmed Qureshi
(74) *Attorney, Agent, or Firm* — O'BANION & RITCHEY LLP; James M. Ritchey

(57) ABSTRACT

A high current and RPM-capable slip ring assembly for use in a selected application for transferring electricity between an exterior environment and an interior environment that includes a non-rotating electrical power member with concentric electrically conducting power transmission bands with wiring and a rotating electrical power member with concentric electrically conducting power transmission bands with wiring and a housing that surrounds both the non-rotating electrical power member and rotating electrical power member to align the first set of concentric electrically conducting power transmission bands and the second set of concentric electrically conducting power transmission bands to slide on one another during rotationally operation of the slip ring assembly.

7 Claims, 3 Drawing Sheets

Related U.S. Application Data

(60) Provisional application No. 62/838,094, filed on Apr. 24, 2019.

(56) References Cited

U.S. PATENT DOCUMENTS

| | | | | |
|---|---|---|---|---|
| 5,588,843 | A | 12/1996 | Sobhani | |
| 6,109,957 | A | 8/2000 | Fladung | |
| 6,162,062 | A | 12/2000 | Liao | |
| 6,400,057 | B2 | 6/2002 | Vesper | |
| 2003/0129855 | A1 | 7/2003 | Douglas | |
| 2009/0184274 | A1 * | 7/2009 | Kikuchi | H01H 1/0206 251/129.01 |
| 2015/0233203 | A1 * | 8/2015 | Schroter | H01R 39/38 175/57 |
| 2015/0288121 | A1 | 10/2015 | Holzapfel | |

FOREIGN PATENT DOCUMENTS

| | | | |
|---|---|---|---|
| JP | 2001249507 | 9/2001 | |
| WO | 2011098586 | 8/2011 | |
| WO | 2018106611 | 6/2018 | |
| WO | WO-2018106611 A1 * | 6/2018 | B64C 11/48 |
| WO | 2020219416 | 10/2020 | |

OTHER PUBLICATIONS

ISA/US, United States Patent and Trademark Office (USPO), International Search Report and Written Opinion dated Jul. 15, 2020, related PCT international application No. PCT/US2020/029065, pp. 1-12, with claims searched, pp. 13-15.

European Patent Office (EPO), Communication (Extended European Search Report) dated Mar. 31, 2023, related patent application No. 20794007.3, pp. 1-13, with claims searched, pp. 14-16.

* cited by examiner

SLIP RING ASSEMBLY WITH PAIRED POWER TRANSMISSION BANDS

CROSS-REFERENCE TO RELATED APPLICATIONS

This application claims priority to, and is a 35 U.S.C. § 111(a) continuation of, PCT international application number PCT/US2020/029065 filed on Apr. 21, 2020, incorporated herein by reference in its entirety, which claims priority to, and the benefit of, U.S. provisional patent application Ser. No. 62/838,094 filed on Apr. 24, 2019, incorporated herein by reference in its entirety. Priority is claimed to each of the foregoing applications.

The above-referenced PCT international application was published as PCT International Publication No. WO 2020/219416 A1 on Oct. 29, 2020, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The subject technology relates to a paired power transmission bands/tracks/rings slip ring assembly that is capable of transmitting high currents at relatively high RPM values and is frequently utilized in conjunction with a counter-rotating (CR) motor. More particularly, the subject technology comprises a series of mated and electrically isolated pairs of band-tracks that rotate about a common axis in which current is passed between a stationary exterior environment and, when operating, a rotating interior environment, as in use with a CR motor.

2. Background Discussion

Slip rings have existed for many decades, however, existing slip rings have two severe limitations: 1) they are mostly utilized with relatively low RPM systems and 2) they are generally not capable of transferring relatively high currents. Limited pancake or flat disk slip rings systems are known. However, these flat disk slip rings constructs include a disk on which a thin contact member rubs, essentially like a typical brush method of contact, and are known for excessive to extreme wear problems. The subject slip ring assembly is particularly useful when configured to operate with a CR motor (e.g.: a CR motor as disclosed in provisional patent application Ser. No. 62/284,535 filed on Oct. 2, 2015 and the converted original patent application Ser. No. 15/330,324 filed on Sep. 6, 2016, both of which are incorporated herein by reference in their entireties). Since CR motors have both the armature and stator rotating in opposite directions the delivery of an electrical current to the rotating field coils is not a simple process and the subject slip ring assembly achieves this function without detectable wear, over at least 100 hours, on the electrical contact members.

See WO 2018/106611, incorporated herein by reference in its entirety, for an exemplary slip ring assembly filed by the subject Assignee, CR Flight L.L.C. This particular slip ring assembly is useful for conducting current into an operating CR motor and other devices.

BRIEF SUMMARY

An object of the subject technology is to produce a paired-bands or paired-tracks slip ring assembly that delivers high currents and voltages while rotating at high RPM values.

Another objective of the subject technology is to provide a paired-bands or paired-tracks slip ring assembly sized to transmits currents with any desirable amperage and voltage, depending on the magnitudes of the desired currents.

Yet a further objective of the subject technology is to manufacture a paired-bands or paired-tracks slip ring assembly that transmits high amperages and voltages from low to high RPM values while remaining relatively cool during operation.

Still yet a further objective of the subject technology is to manufacture a paired-bands or paired-tracks slip ring assembly that transfers current with high amperages, often multiple tens of amps and higher, and high RPM values, often 12,000 RPMs and higher, while remaining relatively cool during operation.

Yet still an additional objective of the subject invention is to disclose paired transmission bands, with each transmission band having a contact surface, comprising a series of electrically isolated from each other and essentially planar concentric electrically conducting bands, all centered on a central rotational axis.

An additional object of the subject technology is to disclose a mass-producible slip ring assembly that is adaptable to various applications for the delivery of electrical power between two locations while the subject device rotates from low to high RPM values.

Disclosed is slip ring assembly comprising: a slip ring assembly for use in a selected application for transferring electrical power between an exterior environment and a rotating interior environment, comprising: a non-rotating electrical power member, comprising: a first electrically non-conductive spindle having a generally planar contacting surface; a first set of concentric channels formed in the first electrically non-conductive spindle planar contacting surface; a first set of concentric electrically conducting power transmission bands, wherein each power transmission band within the set fits within a separate channel of the first set of concentric channels; a set of first electrical wires with each member within the first wire set connected to one the electrically conducting power transmission bands and exiting the non-rotating electrical power member; a rotating electrical power member, comprising: a second electrically non-conductive spindle having a generally planar contacting surface; a second series of concentric channels formed in the second electrically non-conductive spindle planar contacting surface; a second set of concentric electrically conducting power transmission bands, wherein each power transmission band within the set fits within a separate channel of the second set of concentric channels; a set of second electrical wires with each member within the second wire set connected to one the electrically conducting power transmission bands and exiting the rotating electrical power member; and a housing that surrounds both the non-rotating electrical power member and the rotating electrical power member to align the a first set of concentric electrically conducting power transmission bands and the second set of concentric electrically conducting power transmission bands to slide on one another over their the contacting surfaces during rotationally operation of the slip ring assembly.

The slip ring assembly may further comprise a resilient member within the housing that urges the first set of concentric electrically conducting power transmission bands and the second set of concentric electrically conducting power transmission bands towards one another. Also, the slip ring assembly may have either the first set of concentric electrically conducting power transmission bands or the second set of concentric electrically conducting power transmission bands fabricated from a lubricated sintered metallic material and the other is an electrically conducting metal or metal containing material. Additionally, either the first set of concentric electrically conducting power transmission bands or the second set of concentric electrically conducting power transmission bands is fabricated from lubricated Oilite™ and the other is an electrically conducting metal or metal containing material. Further, either the first set of concentric electrically conducting power transmission bands or the second set of concentric electrically conducting power transmission bands is fabricated from lubricated Oilite™ and the other is copper or a copper containing alloy. Frequently, both the first set of concentric electrically conducting power transmission bands and the second set of concentric electrically conducting power transmission bands are fabricated from a lubricated sintered metallic material. Often, both the first set of concentric electrically conducting power transmission bands and the second set of concentric electrically conducting power transmission bands are fabricated from lubricated Oilite™.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
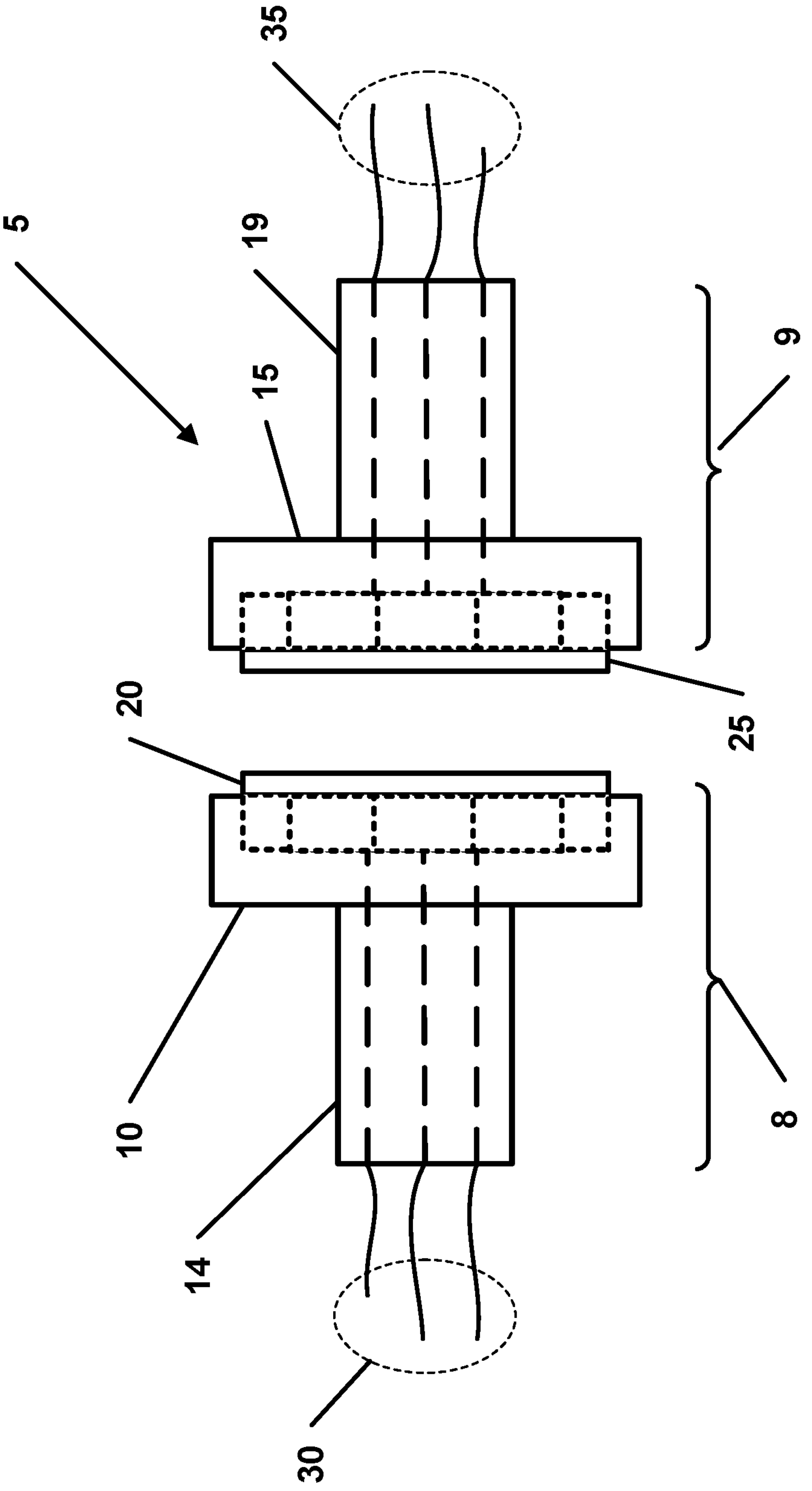
FIG. 1 is a side view of the subject invention showing a stationary or power half member (on the left) and a rotatable power half member (on the right).
Figure 2:
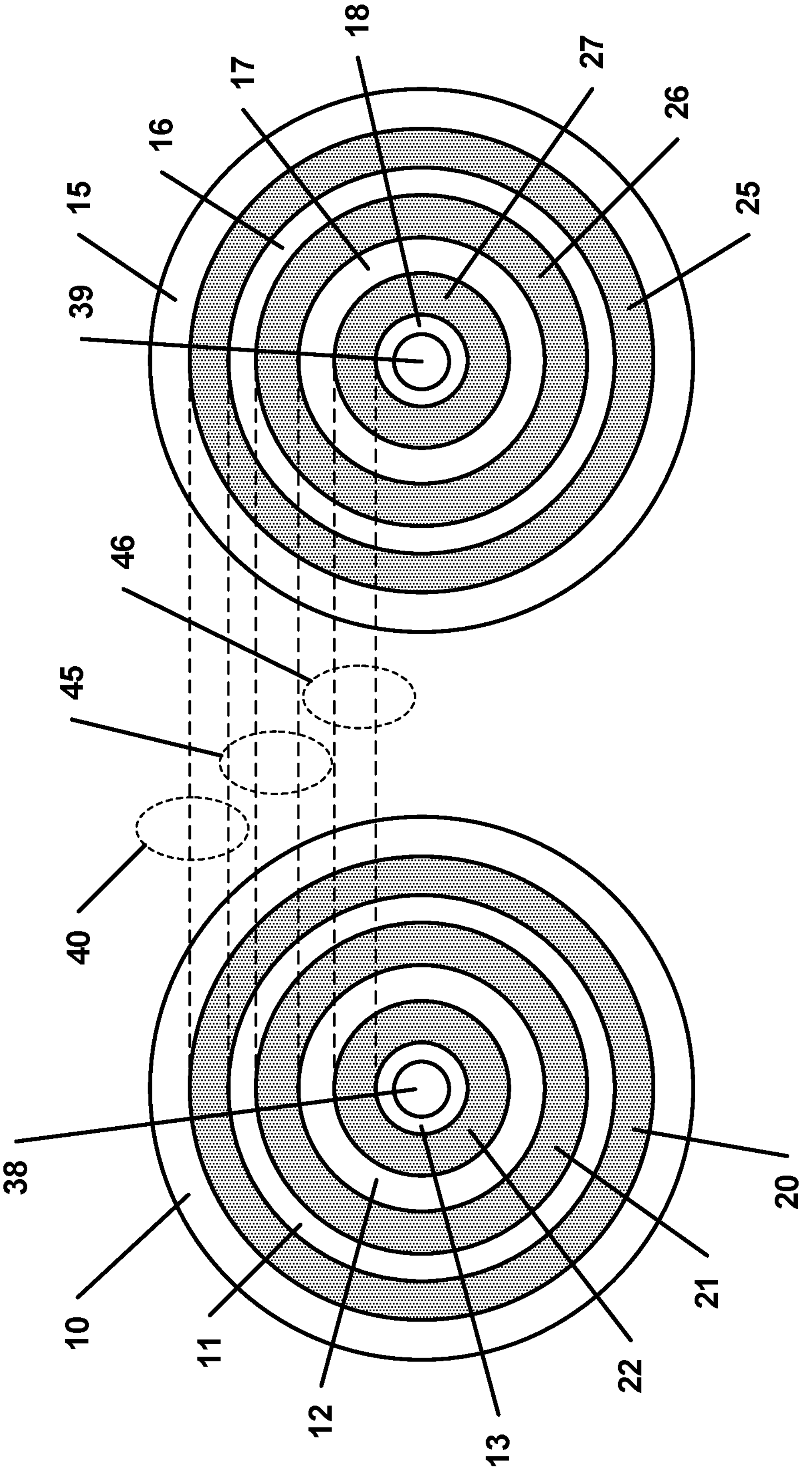
FIG. 2 is a face-on view of the subject invention showing both the power input (left) and power output (right) half members in which the concentric power transmission bands align on against each other, when mated and operating (outer-to-outer, middle-to-middle, and inner-to-inner for three incoming lines).
Figure 3:
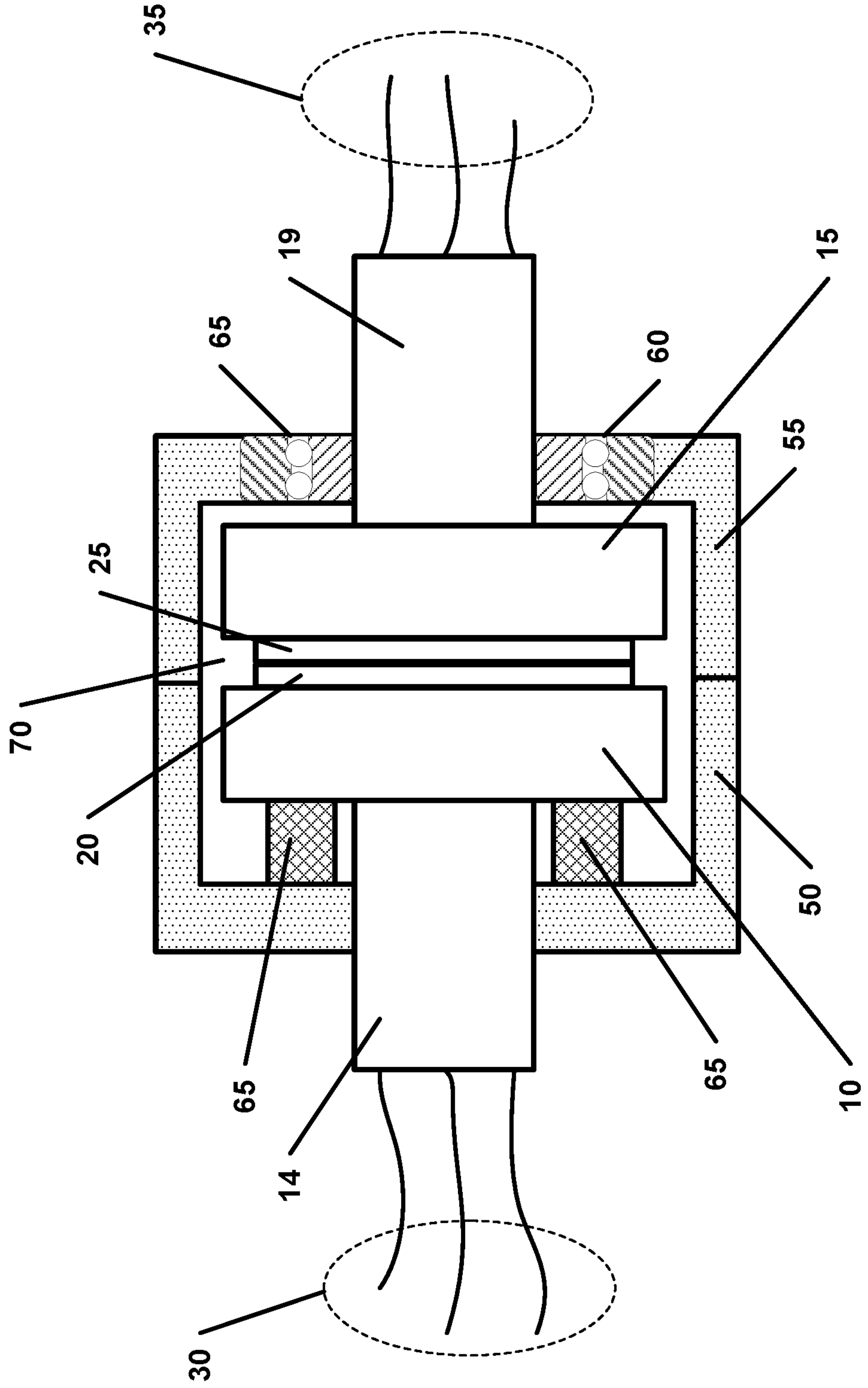
FIG. 3 is a partial cut-away view of the subject slip ring assembly held within a surrounding housing.

Referring more specifically to the drawings, for illustrative purposes the subject technology is embodied in the system generally shown in FIGS. 1 through 3. It will be appreciated that the subject slip ring assembly may vary as to configuration and as to details of the components, and that the method of utilizing the subject technology may vary as to the specific steps and sequence of operation, without departing from the basic concepts as disclosed herein.

Generally, the subject technology comprises a high RPM-capable slip ring assembly for use in a selected application. Frequently the selected application is a system that utilizes a CR motor or equivalent, for transferring electricity between a stationary exterior environment and a rotating interior environment. The flow of electricity may be reversed when the slip ring assembly is utilized in conjunction with a generator or like device. For exemplary purposes only, and not by way of limitation, the below description will be applicable to a CR motor application.

As seen in FIGS. 1 and 2, the subject slip ring assembly 5 includes a non-rotating electrical power member (left side component of FIG. 1) for receiving incoming electricity and a rotating electrical power member for moving outgoing electricity to the selected rotating application (often a CR motor or the equivalent). Comprising the non-rotating electrical power member is an electrically non-conductive spindle 8 having an electrically non-conductive spindle head 10 with a generally planar/flat and exposed contacting surface and an attached support member 14. The generally planar and exposed contacting surface is formed with a set of concentric channels or grooves into which a set of concentric electrically conducting power transmission bands/rings/tracks 20, 21, and 22 are mated (each band has a sintered metallic contacting surface), thereby exposing the non-conducting spindle material 11, 12, and 13 between the electrically conducting power transmission bands/rings/tracks 20, 21, and 22. The top portion of each electrically conducting power transmission band 20, 21, and 22 is exposed and slides over a mated partner power transmission band 25, 26, and 27 in the rotating electrical power member.

A set of electrical wires 30 (three for exemplary purposes only) run through the support member 14 hollow center 38 and are connected to the transmission bands (one wire to each transmission band 20, 21, and 22).

The non-conductive spindle head 10 may be fabricated from suitably rigid materials such as Delrin, Nylon, other polymeric compositions, ceramics, glass, and equivalent non-conductive substances. Likewise, the support member 14 may be fabricated from similar materials and may be created as an extension of the spindle head 10 as a single unit.

Also, as seen in FIGS. 1 and 2, the subject slip ring assembly 5 includes a rotating output electrical power member (right side component of FIG. 1) for outputting electricity to the selected rotating application (often a CR motor or the equivalent). Comprising the rotating electrical power member is an electrically non-conductive spindle 9 having an electrically non-conductive spindle head 15 with a generally planar and exposed contacting surface and an attached support member 19. The generally planar and exposed contacting surface is formed with a set of concentric channels or grooves into which a set of concentric electrically conducting power transmission bands/rings/tracks 25, 26, and 27 are mated, thereby exposing the non-conducting spindle material 15, 16, 17, and 18 between the electrically conducting power transmission bands/rings/tracks 25, 26, and 27. The top portion of each electrically conducting power transmission band 25, 26, and 27 is exposed and slides over a mated partner power transmission band 20, 21, and 22 in the non-rotating electrical power member.

A set of electrical wires 35 (three for exemplary purposes only) run through the support member 19 hollow center 39 and are connected to the transmission bands (one wire to each transmission band 25, 26, and 27).

The non-conductive spindle head 15 may be fabricated from suitably rigid materials such as Delrin, Nylon, other polymeric compositions, ceramics, glass, and equivalent non-conductive substances. Likewise, the support member 19 may be fabricated from similar materials and may be created as an extension of the spindle head 15 as a single unit.

FIG. 2 shows that when the non-rotating and rotating electrical power members 10 and 15 rotationally mate to one another the transmission bands/tracks/rings align on top of one another 40. 45, and 46.

FIG. 3 shows a housing formed from mated halves 50 and 55 surrounds the spindle heads 10 and 15 and at least a portion of the support members 14 and 19. The two halves 50 and 55 may be releasably (or permanently if desired) secured to one another standard means such as threading, clips, and the like. Within the housing is resilient means 65 for urging the sliding surfaces (20 to 25, 21 to 26, and 22 to 27 in the example) towards one another to maintain electrical contact during rotation. The resilient means may be springs, compressible foam, and the like. Bearing 60 and 65 mounted in one frame half 55 permit the rotating electrical power member (15 and 19) to rotate.

The two sets electrically conductive power transmission bands/tracks/rings 20, 21, and 22 and 25, 26, and 27 are fabricated from a variety of possible materials with the limitation that at least one band/track/ring in each slip-mated pair is formed from a porous/sintered material that contains a lubricant of desired viscosity and is exemplified by the readily and commercially available copper or steel Oilite™ material. Preferred porous/sintered electrically conducting material are fabricated from a metal, metal alloy, of the equivalent and preferably a brass alloy for efficient electrical conductivity and impregnated with an oil lubricant such as the commonly available Oilite™ material. Again, it is noted that Oilite™ is a porous/sintered bronze, brass, iron alloy, or other electrically conducting metal or non-metal material commonly holding an oil lubricant and readily available from numerous commercial suppliers. Sintered brass or bronze, with absorbed lubricant, is a preferred exemplary material utilized for these components and conducts electricity very efficiently. The oil lubricant may be natural or synthetic. The porous/sintered bands or tracks (such as commercially available Oilite™) are often formed using powder metallurgy so that tiny pores are present in the metal. The pores are then vacuum impregnated with an oil to improve the materials bearing ability. The material holds approximately 20% oil by volume. A common lubricant is SAE 30 oil or other equivalents. Other equivalent materials to Oilite™ may be utilized with the subject technology.

Both of the two sets of electrically conductive power transmission bands/tracks/rings 20, 21, and 22 and 25, 26, and 27 may be fabricated from lubricated porous/sintered metal (exemplary Oilite™) or one set may be formed from the lubricated porous/sintered metal and the other set may be a metal such as brass, bronze, copper, steel, metal alloy, carbon, carbon composites, synthetic electrically conductive polymers, other suitable conductive metals and non-metals, and the like. Clearly, these paired combinations may be mixed between bands/rings/track in either electrical power member as long as one sliding band/ring/track mated pairs is made of a lubricated porous/sintered substance.

The volume 75 between the surrounding housing 50 and 55 may be filled with additional lubricant to facilitate rotation.

From the description herein, it will be appreciated that the present disclosure encompasses multiple embodiments which include, but are not limited to, the following: a slip ring assembly for use in a selected application for transferring electrical power between a stationary exterior environment and a rotating interior environment, comprising: a non-rotating electrical power member, comprising: a first sintered metallic contacting surface and a first electrical wire coupling said non-rotating electrical power member to a stationary exterior member; a rotating electrical power member, comprising a second sintered metallic contacting surface and a second electrical wire coupling said rotating electrical power member to a rotating interior member; and a lubricant applied to both said first and second sintered metallic contacting surfaces to facilitate motion of said second sintered metallic contacting surface over said first sintered metallic contacting surface during rotation.

Additionally, an embodiment of the subject technology includes: a slip ring assembly for use in a selected application for transferring electrical power between an exterior environment and a rotating interior environment, comprising: a non-rotating electrical power member, comprising: a first electrically non-conductive spindle having a generally planar contacting surface; a first set of concentric channels formed in the first electrically non-conductive spindle planar contacting surface; a first set of concentric electrically conducting power transmission bands, wherein each power transmission band within the set fits within a separate channel of the first set of concentric channels; a set of first electrical wires with each member within the first wire set connected to one the electrically conducting power transmission bands and exiting the non-rotating electrical power member; a rotating electrical power member, comprising: a second electrically non-conductive spindle having a generally planar contacting surface; a second series of concentric channels formed in the second electrically non-conductive spindle planar contacting surface; a second set of concentric electrically conducting power transmission bands, wherein each power transmission band within the set fits within a separate channel of the second set of concentric channels; a set of second electrical wires with each member within the second wire set connected to one the electrically conducting power transmission bands and exiting the rotating electrical power member; and a housing that surrounds both the non-rotating electrical power member and the rotating electrical power member to align the a first set of concentric electrically conducting power transmission bands and the second set of concentric electrically conducting power transmission bands to slide on one another over their the contacting surfaces during rotationally operation of the slip ring assembly.

Additionally, embodiments may further comprise a resilient member within the housing that urges the first set of concentric electrically conducting power transmission bands and the second set of concentric electrically conducting power transmission bands towards one another.

A further embodiment has either the first set of concentric electrically conducting power transmission bands or the second set of concentric electrically conducting power transmission bands fabricated from a lubricated sintered metallic material and the other is an electrically conducting metal or metal containing material. Also, either the first set of concentric electrically conducting power transmission bands or the second set of concentric electrically conducting power transmission bands is fabricated from lubricated Oilite™ and the other is an electrically conducting metal or metal containing material. Additionally, either the first set of concentric electrically conducting power transmission bands or the second set of concentric electrically conducting power transmission bands is fabricated from lubricated Oilite™ and the other is copper or a copper containing alloy. Often, both the first set of concentric electrically conducting power transmission bands and the second set of concentric electrically conducting power transmission bands are fabricated from a lubricated sintered metallic material. Frequently, both the first set of concentric electrically conducting power transmission bands and the second set of concentric electrically conducting power transmission bands are fabricated from lubricated Oilite™.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A slip ring assembly for use in a selected application for transferring electrical power between a stationary exterior environment and a rotating interior environment, comprising: (a) a non-rotating electrical power member, comprising: (i) a first sintered metallic contacting surface and (ii) a first electrical wire coupling said non-rotating electrical power member to a stationary exterior member; (b) a rotating electrical power member, comprising (i) a second sintered metallic contacting surface and (ii) a second electrical wire coupling said rotating electrical power member to a rotating interior member; and (c) a lubricant applied to both said first and second sintered metallic contacting surfaces to facilitate motion of said second sintered metallic contacting surface over said first sintered metallic contacting surface during rotation.

2. A slip ring assembly for use in a selected application for transferring electrical power between a stationary exterior environment and a rotating interior environment, comprising: (a) a non-rotating electrical power member, comprising: (i) a first electrically non-conductive spindle having a generally planar contacting surface; (ii) a first set of concentric channels formed in said first electrically non-conductive spindle planar contacting surface; (iii) a first set of concentric electrically conducting power transmission bands, wherein each power transmission band within said set fits within a separate channel of said first set of concentric channels; (iv) a set of first electrical wires with each member within said first wire set connected to one said electrically conducting power transmission bands and exiting from said non-rotating electrical power member; (b) a rotating electrical power member, comprising: (i) a second electrically non-conductive spindle having a generally planar contacting surface; (ii) a second series of concentric channels formed in said second electrically non-conductive spindle planar contacting surface; (iii)

a second set of concentric electrically conducting power transmission bands, wherein each power transmission band within said set fits within a separate channel of said second set of concentric channels; (v) a set of second electrical wires with each member within said second wire set connected to one said electrically conducting power transmission bands and exiting said rotating electrical power member; and (c) a housing that surrounds both said non-rotating electrical power member and said rotating electrical power member to align said first set of concentric electrically conducting power transmission bands and said second set of concentric electrically conducting power transmission bands to slide on one another over their said contacting surfaces during rotationally operation of the slip ring assembly.

3. The slip ring assembly according to any preceding or following embodiment, further comprising a resilient member within said housing that urges said first set of concentric electrically conducting power transmission bands and said second set of concentric electrically conducting power transmission bands towards one another.

4. The slip ring assembly according to any preceding or following embodiment, wherein either said first set of concentric electrically conducting power transmission bands or said second set of concentric electrically conducting power transmission bands is fabricated from a lubricated sintered metallic material and the other is an electrically conducting metal or metal containing material.

5. The slip ring assembly according to any preceding or following embodiment, wherein either said first set of concentric electrically conducting power transmission bands or said second set of concentric electrically conducting power transmission bands is fabricated from lubricated Oilite™ and the other is an electrically conducting metal or metal containing material.

6. The slip ring assembly according to any preceding or following embodiment, wherein either said first set of concentric electrically conducting power transmission bands or said second set of concentric electrically conducting power transmission bands is fabricated from lubricated Oilite™ and the other is copper or a copper containing alloy.

7. The slip ring assembly according to any preceding or following embodiment, wherein both said first set of concentric electrically conducting power transmission bands and said second set of concentric electrically conducting power transmission bands are fabricated from a lubricated sintered metallic material.

8. The slip ring assembly according to any preceding or following embodiment, wherein both said first set of concentric electrically conducting power transmission bands and said second set of concentric electrically conducting power transmission bands are fabricated from lubricated Oilite™.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A slip ring assembly for transferring high currents of electrical power for high RPM operation between a stationary exterior environment and a rotating interior environment, comprising:

a. a non-rotating electrical power member, comprising:

i. a first electrically non-conductive spindle having a generally planar contacting surface;

ii. a first set of concentric channels formed in said first electrically non-conductive spindle planar contacting surface;

iii. a first set of concentric electrically conducting power transmission bands, wherein each power transmission band within said set fits within a separate channel of said first set of concentric channels;

iv. a set of first electrical wires with each member within said first wire set connected to one said electrically conducting power transmission bands and exiting from said non-rotating electrical power member;

b. a rotating electrical power member, comprising:

i. a second electrically non-conductive spindle having a generally planar contacting surface;

ii. a second series of concentric channels formed in said second electrically non-conductive spindle planar contacting surface;

iii. a second set of concentric electrically conducting power transmission bands, wherein each power transmission band within said set fits within a separate channel of said second set of concentric channels;

iv. a set of second electrical wires with each member within said second wire set connected to one said electrically conducting power transmission bands and exiting said rotating electrical power member; and c. a housing that surrounds both said non-rotating electrical power member and said rotating electrical power member to align said first set of concentric electrically conducting power transmission bands and said second set of concentric electrically conducting power transmission bands to slide on one another over their said contacting surfaces during rotationally operation of the slip ring assembly.

2. The slip ring assembly according to claim 1, further comprising a resilient member within said housing that urges said first set of concentric electrically conducting power transmission bands and said second set of concentric electrically conducting power transmission bands towards one another.

3. The slip ring assembly according to claim 1, wherein either said first set of concentric electrically conducting power transmission bands or said second set of concentric electrically conducting power transmission bands is fabricated from a lubricated sintered metallic material and the other is an electrically conducting metal or metal containing material.

4. The slip ring assembly according to claim 1, wherein either said first set of concentric electrically conducting power transmission bands or said second set of concentric electrically conducting power transmission bands is fabricated from lubricated Oilite™ and the other is an electrically conducting metal or metal containing material.

5. The slip ring assembly according to claim 1, wherein either said first set of concentric electrically conducting power transmission bands or said second set of concentric electrically conducting power transmission bands is fabricated from lubricated Oilite™ and the other is copper or a copper containing alloy.

6. The slip ring assembly according to claim 1, wherein both said first set of concentric electrically conducting power transmission bands and said second set of concentric electrically conducting power transmission bands are fabricated from a lubricated sintered metallic material.

7. The slip ring assembly according to claim 1, wherein both said first set of concentric electrically conducting power transmission bands and said second set of concentric electrically conducting power transmission bands are fabricated from lubricated Oilite™.

* * * * *